US010169560B2

(12) United States Patent
Cudak et al.

(10) Patent No.: US 10,169,560 B2
(45) Date of Patent: Jan. 1, 2019

(54) STIMULI-BASED AUTHENTICATION

(71) Applicant: Lenovo Enterprise Solutions (Singapore) PTE. LTE., New Tech Park (SG)

(72) Inventors: Gary D. Cudak, Wake Forest, NC (US); Rod D. Waltermann, Morrisville, NC (US); Nagananda Chumbalkar, Raleigh, NC (US); James G. McLean, Raleigh, NC (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 186 days.

(21) Appl. No.: 15/015,770

(22) Filed: Feb. 4, 2016

(65) Prior Publication Data

US 2017/0228526 A1 Aug. 10, 2017

(51) Int. Cl.
*G06F 21/32* (2013.01)
*H04L 29/06* (2006.01)

(52) U.S. Cl.
CPC .......... *G06F 21/32* (2013.01); *H04L 63/0861* (2013.01)

(58) Field of Classification Search
CPC ................ G06F 21/32; H04L 63/0861
See application file for complete search history.

(56) References Cited

U.S. PATENT DOCUMENTS

| | | | | |
|---|---|---|---|---|
| 5,788,648 A | * | 8/1998 | Nadel | A61B 5/0484 600/300 |
| 7,427,138 B2 | * | 9/2008 | Ellenbogen | A61B 3/022 351/243 |
| 7,515,054 B2 | * | 4/2009 | Torch | A61B 3/0066 340/573.1 |
| 2004/0193068 A1 | * | 9/2004 | Burton | A61B 5/0476 600/544 |
| 2005/0240778 A1 | * | 10/2005 | Saito | G06K 19/0723 713/186 |
| 2008/0084537 A1 | * | 4/2008 | Khaderi | A61B 3/032 351/205 |
| 2008/0229408 A1 | * | 9/2008 | Dinges | G06K 9/00885 726/19 |
| 2009/0109398 A1 | * | 4/2009 | Ellenbogen | A61H 5/00 351/203 |

(Continued)

FOREIGN PATENT DOCUMENTS

WO   WO 2015178549 A1 * 11/2015 ............. G06F 21/32

OTHER PUBLICATIONS

Michael Kassner, "Is it time to replace passwords with passthougts?", Tech Republic, Last edited Mar. 17, 2015, http://www.techrepublic.com/article/is-it-time-to-replace-passwords-with-passthoughts/, http://www.techrepublic.com/article/is-it-time-to-replace-passwords-with-passthoughts/, Last visited Dec. 22, 2015.

(Continued)

*Primary Examiner* — Joseph P Hirl
*Assistant Examiner* — J. Brant Murphy
(74) *Attorney, Agent, or Firm* — Kunzler, PC

(57) ABSTRACT

A method for stimuli-based authentication includes presenting one or more stimuli to a person. The method includes measuring a brainwave response of the person to the one or more stimuli, and authenticating the person based on the measured brainwave response.

19 Claims, 5 Drawing Sheets

(56) References Cited

U.S. PATENT DOCUMENTS

| | | | | |
|---|---|---|---|---|
| 2010/0134758 A1* | 6/2010 | Petignaud | A61B 3/02 | 351/203 |
| 2010/0185113 A1* | 7/2010 | Peot | A61B 5/7267 | 600/544 |
| 2011/0162067 A1* | 6/2011 | Shuart | G06F 21/31 | 726/19 |
| 2012/0010474 A1* | 1/2012 | Olsen | A61B 5/0484 | 600/301 |
| 2012/0094700 A1* | 4/2012 | Karmarkar | G06F 3/013 | 455/466 |
| 2012/0271194 A1* | 10/2012 | MacLullich | A61B 5/16 | 600/558 |
| 2013/0113628 A1* | 5/2013 | Shepherd | A61B 5/0476 | 340/573.1 |
| 2013/0150004 A1* | 6/2013 | Rosen | H04W 8/22 | 455/414.1 |
| 2013/0239187 A1* | 9/2013 | Leddy | H04L 9/3226 | 726/6 |
| 2014/0020089 A1* | 1/2014 | Perini, II | G06F 21/32 | 726/19 |
| 2014/0289833 A1* | 9/2014 | Briceno | H04L 63/08 | 726/7 |
| 2015/0033305 A1* | 1/2015 | Shear | G06F 21/45 | 726/6 |
| 2015/0096002 A1* | 4/2015 | Shuart | G06F 21/32 | 726/7 |
| 2015/0097772 A1* | 4/2015 | Starner | G06F 3/013 | 345/158 |
| 2015/0164363 A1* | 6/2015 | Kocher | A61B 5/04842 | 600/544 |
| 2015/0269009 A1* | 9/2015 | Faaborg | G06F 9/546 | 719/315 |
| 2015/0338915 A1* | 11/2015 | Publicover | G06F 21/64 | 345/633 |
| 2016/0062540 A1* | 3/2016 | Yang | G06F 3/0481 | 345/173 |
| 2016/0103487 A1* | 4/2016 | Crawford | G06F 3/015 | 600/544 |
| 2016/0117947 A1* | 4/2016 | Misu | G09B 9/04 | 434/62 |
| 2016/0210407 A1* | 7/2016 | Hwang | G06Q 50/22 | |
| 2017/0177023 A1* | 6/2017 | Simon | G09C 1/00 | |
| 2017/0325720 A1* | 11/2017 | Hasegawa | A61B 5/117 | |

OTHER PUBLICATIONS

Benjamin Johnson et al., "My Thoughts Are Not Your Thoughts," UBICOMP '14 ADJUNCT, Last edited Sep. 13-17, 2014 Seattle, WA, http://ubicomp.org/ubicomp2014/proceedings/ubicomp_adjunct/workshops/UPSIDE/p1329-johnson.pdf, Last visited Dec. 22, 2015.

* cited by examiner

STIMULI-BASED AUTHENTICATION

FIELD

The subject matter disclosed herein relates to authenticating people and more particularly relates to authenticating people by measuring responses to stimuli.

BACKGROUND

Authenticating a person for access to a computer system, a building, or the like may involve confirming the person's identity in various ways, such as by use of a password, a security question, an identity card, a security token, a signature, a fingerprint, a retinal pattern, and/or additional factors. An unauthorized person may attempt to access a system by using, copying, or imitating the credentials of an authorized person.

BRIEF SUMMARY

A method for stimuli-based authentication is disclosed. A computer program product and a system also perform the functions of the method. The method includes presenting one or more stimuli to a person, measuring a brainwave response of the person to the one or more stimuli, and authenticating the person based on the measured brainwave response.

In one embodiment, the method includes recording a plurality of brainwave responses of the person to a plurality of stimuli. In a certain embodiment, the one or more presented stimuli are selected from the plurality of stimuli. In a further embodiment, one or more of the plurality of stimuli is selected by the person for recording a response, based on an emotional relevance of the one or more selected stimuli to the person. In some embodiments, recording a plurality of brainwave responses of the person to a plurality of stimuli may include recording multiple brainwave responses for a stimulus.

In one embodiment, the one or more presented stimuli may include a visual stimulus, an audio stimulus, an audiovisual stimulus, a tactile stimulus, and/or an olfactory stimulus. In a certain embodiment, the one or more presented stimuli may include multiple stimuli of more than one type. In a further embodiment, the one or more presented stimuli may be presented to the person one at a time in a random order. In some embodiments, the one or more presented stimuli may be presented to the person for random durations.

In one embodiment, authenticating the person includes comparing the measured brainwave response to one or more prerecorded responses to determine a likelihood that the person is correctly identified. In a further embodiment, the prerecorded responses include prerecorded responses of the person to the one or more presented stimuli.

In a certain embodiment, the method includes presenting one or more additional stimuli to the person, measuring an additional brainwave response of the person to the one or more additional stimuli, and comparing the measured additional brainwave response to one or more prerecorded responses to determine an updated likelihood that the person is correctly identified, in response to the likelihood failing to satisfy a confidence threshold. In a further embodiment, the prerecorded responses include prerecorded responses of the person to the one or more additional stimuli. In some embodiments, the person may be authenticated based on the measured brainwave response and on one or more inputs from the person other than a brainwave response.

A program product for stimuli-based authentication includes a computer readable storage medium that stores code executable by a processor. The executable code includes code to perform: presenting one or more stimuli to a person, measuring a brainwave response of the person to the one or more stimuli, and authenticating the person based on the measured brainwave response.

In one embodiment, the executable code includes code to perform recording a plurality of brainwave responses of the person to a plurality of stimuli. In a certain embodiment, the one or more presented stimuli are selected from the plurality of stimuli. In a further embodiment, one or more of the plurality of stimuli is selected by the person for recording a response based on an emotional relevance of the one or more selected stimuli to the person. In some embodiments, recording a plurality of brainwave responses of the person to a plurality of stimuli may include recording multiple brainwave responses for a stimulus.

A system for stimuli-based authentication includes an electroencephalography ("EEG") monitor, a stimulus module configured to present one or more stimuli to a person, a response module configured to measure a brainwave response of the person to the one or more stimuli using the EEG monitor, and an authentication module configured to authenticate the person based on the measured brainwave response.

In one embodiment, the system includes a response recorder module configured to record a plurality of brainwave responses of the person to a plurality of stimuli. In a certain embodiment, the one or more presented stimuli are selected from the plurality of stimuli. In a further embodiment, the system may include a data storage device for storing the recorded brainwave responses. In one embodiment, one or more of the plurality of stimuli may be selected by the person for recording a response based on an emotional relevance of the one or more selected stimuli to the person. In a certain embodiment, recording a plurality of brainwave responses of the person to a plurality of stimuli may include recording multiple brainwave responses for a stimulus.

In one embodiment, the system includes a confidence module configured to compare the measured brainwave response to one or more prerecorded responses to determine a likelihood that the person is correctly identified. In a further embodiment, the prerecorded responses include prerecorded responses of the person to the one or more presented stimuli.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
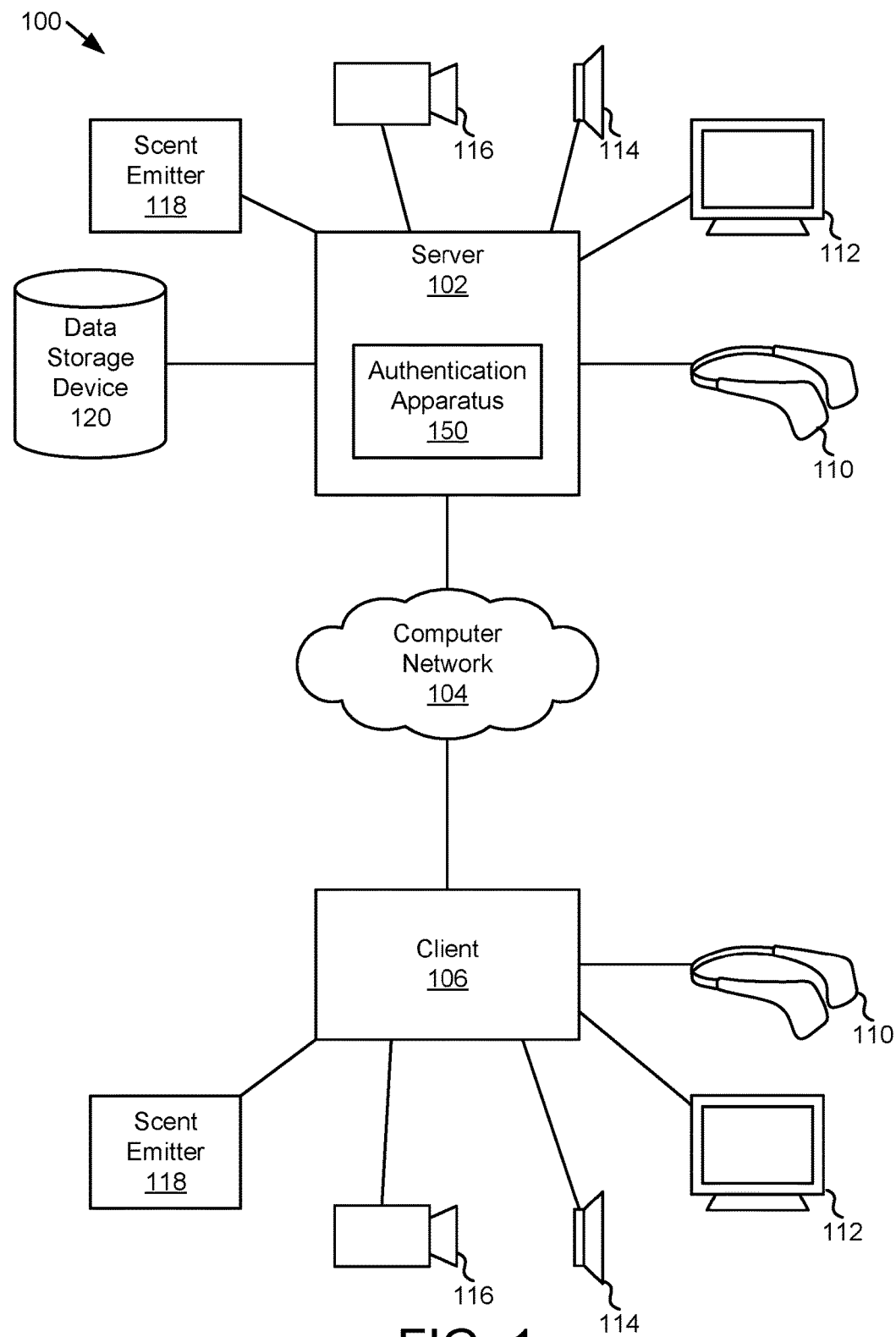
FIG. 1 is a schematic block diagram illustrating one embodiment of a system for stimuli-based authentication.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for stimuli-based authentication. In the depicted embodiment, the system 100 includes an authentication apparatus 150 operating on a server 102, a computer network 104, a client 106, and a data storage device 120. In various embodiments, the system 100 may include an electroencephalography ("EEG") monitor 110, a computer monitor 112, speaker 114, camera 116 and/or scent emitter 118, coupled to the server 102 and/or the client 106.

In general, in various embodiments, the authentication apparatus 150 may present one or more stimuli to a person, such as a user of the system 100, measure a brainwave response of the person to the one or more stimuli; and authenticate the person based on the measured brainwave response. In certain embodiments, authenticating a user of the system 100 based on a brainwave response (or another response) to a stimulus may prevent access to the system 100 by an unauthorized user with a different response to the same stimulus. In further embodiments, even if a brainwave response can be trained, or measured and played back, random presentation of one or more stimuli may prevent an unauthorized user from anticipating or imitating a correct response. The authentication apparatus 150 is described in further detail below with regard to the apparatuses 200, 300 of FIGS. 2 and 3.

In the depicted embodiment, the authentication apparatus 150 operates on or is embodied by the server 102. In another embodiment, the authentication apparatus 150 may operate on or be embodied by the client 106, a combination of the server 102 and the client 106, a computer that implements the authentication apparatus 150 outside a server/client architecture, or the like. In view of this disclosure, many ways to implement an authentication apparatus 150 are clear.

In one embodiment, the server 102 may be a mainframe, a blade server, a workstation, a desktop computer, a laptop computer, a virtual machine, or the like. The server 102 may use the authentication apparatus 150 to control access to resources of the system 100, the server 102, the client 106, other computers via the computer network 104, physical resources such as a room or a building, or the like.

The client 106 may be a desktop computer, laptop computer, virtual machine, tablet, mobile phone, or the like. The client 106 may be in communication with the server 102 via the computer network 104. In one embodiment, a user of the client 106 may request access, via the server 102, to a resource the server 102 controls access to, and the server 102 may use the authentication apparatus 150 to authenticate the user, to determine whether to grant or deny access to the requested resource. For example, in one embodiment, a user may use a browser operating on the client 106 to log into a website hosted by the server 102 (or with a login component of the website operating on the server 102), and the server 102 may use the authentication apparatus 150 to authenticate the user. In another embodiment, a user may use a mobile phone app operating on the client 106 to access a service provided by the server 102 (or with a login component of the website operating on the server 102), and the server 102 may use the authentication apparatus 150 to authenticate the user. In view of this disclosure, many implementations that use an authentication apparatus 150 to authenticate the user are clear.

The computer network 104, in various embodiments, may include a local area network ("LAN"), a wireless connection, an Internet connection, or the like. The computer network 104 may include one or more switches, routers, data cables, transmitters, and the like normally associated with a computer network 104. In one embodiment, the computer network 104 includes multiple networks functioning to transmit data between the server 102 and the client 106, between the data storage device 120 and the server 102, or the like.

A wireless connection for the computer network 104 may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials ("ASTM"), the DASH? Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification ("IrPHY") as defined by the Infrared Data Association ("IrDA"). Alternatively, the wireless connection may be a cellular telephone network communication. All standards and/or connection types include the latest version and revision of the standard and/or connection type as of the filing date of this application.

In one embodiment, the data storage device 120 is internal to the server 102 or other computing device that includes the authentication apparatus 150. In another embodiment, the data storage device 120 is located externally to the server 102, laptop, etc. that includes the authentication apparatus 150. For example, the data storage device 120 may include one or more computer readable storage media in a network, such as a storage area network, in an array, etc. The data storage device 120 may include a hard drive, solid state drive, hybrid drive, storage array, or the like. In certain embodiments, the data storage device 120 may store recorded brainwave responses for comparison to the measured brainwave response. In various embodiments, comparing a user's response to one or more stimuli to a prerecorded response (or set of responses) stored by the data storage device 120 may allow the authentication apparatus 150 to confirm a user's identity, or to determine whether a user is authorized or unauthorized to access resources controlled by the system 100. One of skill in the art will recognize other forms of a data storage device 120 for storing prerecorded brainwave responses, in communication with an authentication apparatus 150.

In one embodiment, the system 100 includes one or more electroencephalography ("EEG") monitors 110. An EEG monitor 110 may be coupled to the server 102 and/or the client 106, and may be used to prerecord a person's responses to stimuli and/or to measure a person's brainwave responses for comparison to the prerecorded responses. In certain embodiments, scalp electrodes, as for a medical EEG recording, may take extensive amounts of time to apply. However, in various embodiments, a low-cost or consumer-grade EEG monitor 110 may be quickly and conveniently used to measure a brainwave response. For example, in one embodiment the EEG monitor 110 may be a brain sensing headband such as the MUSE™ brain sensing headband available from InteraXon Inc., of Toronto, Ontario, Canada. Various EEG monitors 110 suitable for use with an authentication apparatus 150 will be clear in view of this disclosure.

In one embodiment, one EEG monitor 110 may be used to prerecord responses to stimuli, and another EEG monitor 110 may be used to measure responses to authenticate a person. In certain embodiments, multiple EEG monitors 110 may be similar or identical, or may make similar brainwave measurements, so that the measured brainwave response for authentication may be usefully compared to prerecorded responses. In another embodiment, a person may use the same EEG monitor 110 for authentication and for prerecording responses. In a certain embodiment, each person may use his or her own individual EEG monitor 110. For example, each person may have an EEG monitor 110 for use with that person's clients 106. In another embodiment, an EEG monitor 110 may be collectively used. For example, a system 100 that uses an authentication apparatus 150 to control access to a building may include a collectively used EEG monitor 110 at a building entrance. In view of this disclosure, many suitable arrangements of EEG monitors 110 for use with an authentication apparatus 150 will be clear.

In certain embodiments, the system 100 may include various peripherals such as a computer monitor 112, speaker 114, camera 116 and/or scent emitter 118, coupled to the server 102 and/or the client 106, for presenting stimuli, or for recording responses other than brainwave responses. For example, in various embodiments, stimuli may include a visual stimulus displayed by the computer monitor 112, an audio stimulus played on the speaker 114, an audiovisual stimulus presented on the computer monitor 112 and the speaker 114, an olfactory stimulus presented by a scent emitter 118, a tactile stimulus or the like. The speaker 114, computer monitor 112, scent emitter 118, etc. may take various forms. For example, the speaker 114 may be integrated into headphones, the computer monitor 112 may be in the form of goggles or glasses, etc. In a further embodiment, an EEG monitor 110 may measure a brainwave response, and an additional response, such as a facial response, a gesture, an audible response, or the like, may be recorded by a camera 116, a microphone (not shown), or other input device.

While several devices are depicted in FIG. 1, the embodiments of the system 100 described herein contemplate other devices for presenting stimuli and recording or measuring responses. Other devices capable of presenting stimuli and/or recording or measuring responses are clear in view of this disclosure.

Figure 2:
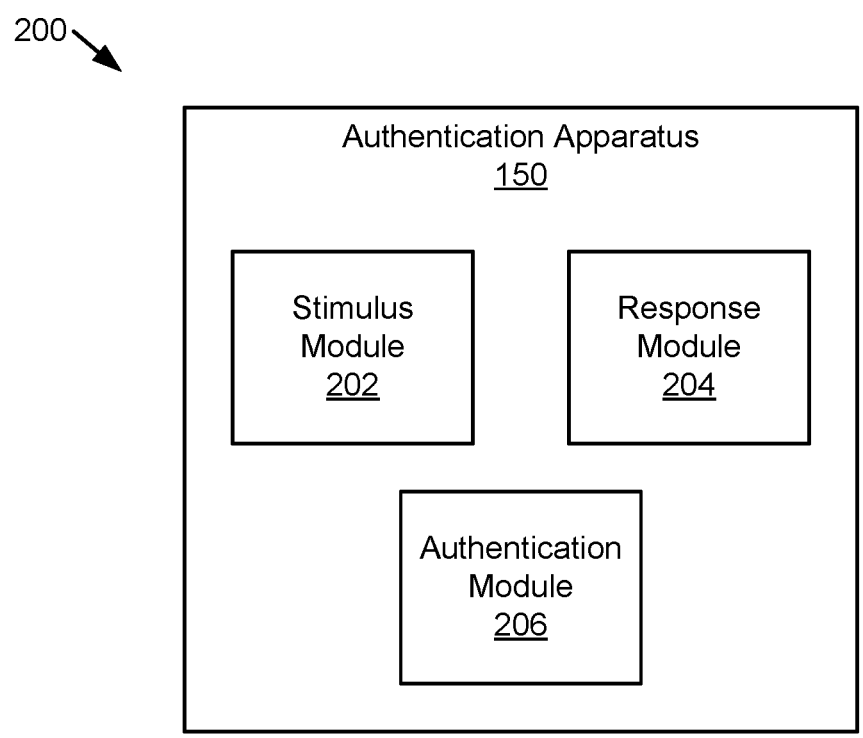
FIG. 2 is a schematic block diagram illustrating one embodiment of an apparatus for stimuli-based authentication.

FIG. 2 depicts one embodiment of an apparatus 200 for stimuli-based authentication. The apparatus 200 includes one embodiment of the authentication apparatus 150 with a stimulus module 202, a response module 204, and an authentication module 206, which are described below.

In one embodiment, the apparatus 200 includes a stimulus module 202 configured to present one or more stimuli to a person. In various embodiments, a stimulus module 202 may include a computer monitor 112, a speaker 114, a scent emitter 118, a hardware circuit, a programmable hardware device, one or more processors, and/or a computer readable storage medium that stores code for execution by one or more processors. Other embodiments may include similar or equivalent devices for presenting stimuli.

In one embodiment, the person to whom the stimulus module 202 presents one or more stimuli may be a user of a computer system, such as the system 100 of FIG. 1, and may be authenticated to determine whether the person will be permitted to use certain secure resources of the computer system, or resources controlled by the computer system. In another embodiment, the person may be seeking access to a physical location, such as a secure building, a secure room, a vault, a safe, or the like and may be authenticated to determine whether the person will be permitted to enter the physical location. In another embodiment, the person may be seeking access to a financial account, and may be authenticated to determine whether the person is the owner (or authorized user) of the financial account. In view of this disclosure, many reasons for authenticating a person are clear.

In certain embodiments, a computer system that authenticates users may be substantially similar to the system 100 of FIG. 1. In one embodiment, the computer system may include resources (such as user accounts) that are only available to authenticated users. In another embodiment, the computer system may control access to resources of other computer systems, or other physical resources, that are only available to authenticated users. For example, the computer system may control access to a website, a data storage service, software as a service, a financial account, a building entrance, or the like. Many types of computer systems that authenticate users will be clear in view of this disclosure. In another embodiment, as described above, the apparatus 200 may use stimuli-based authentication to control access to a resource other than a computer system, such as a physical location, a financial account, or the like.

In general, authenticating a person may involve confirming a person's identity, or determining whether a person is authorized to access a computer system, resources controlled by the computer system, a physical location, a financial account, or the like. Certain types of authentication ask people to identify themselves by entering a login or username, and then to verify their identity by entering a secret password. However, passwords may be easily observed and duplicated by an unauthorized person intercepting the password, looking over an authorized person's shoulder, cracking a password database, or the like. Some types of authentication may replace a password with a "passthought," known to an authorized person, and monitored by EEG. The passthought itself may be kept secret, and may be difficult to duplicate or imitate even if known, because different people may produce different EEG signals even when thinking the same thing.

However, a person could be trained to match a known EEG signal, or the signal itself could be intercepted and duplicated. In certain embodiments, authenticating a person based on a measured brainwave response to one or more stimuli may allow the number, order, duration, or the like of the stimuli to be varied so that a previous brainwave response, recorded or imitated by an unauthorized person, does not match an authorized person's expected response. Additionally, authenticating people based on responses to stimuli may, in certain embodiments, provide a simple and/or hands-free authentication process, which does not involve remembering a password, passthought, answers to security questions, or the like.

In various embodiments, the user or person seeking authentication may be any person attempting to use a computer system, access a physical location, or the like. For example, a user may be any person attempting to log in to a website, use an online service, access private data, access a building, or the like. Thus, in some embodiments, a user may be an authorized user of a computer system or other resources. In another embodiment, a user may not be an authorized user of the computer system or other resources, and the apparatus 200 may deny access for the user.

In certain embodiments, a stimulus may include any thing or event that, when viewed or otherwise experienced by the person, produces a brainwave response in the person. In various embodiments, the one or more stimuli presented by the stimulus module 202 may include one or more of a visual stimulus an audio stimulus, an audiovisual stimulus, a tactile stimulus, and/or an olfactory stimulus, or the like. A visual stimulus may include visual content, such as a picture, a pattern, or the like. An audio stimulus may include an audio content such as a sound recording of music, a person speaking, animal sounds, sounds associated with a particular location, or the like. An audiovisual stimulus may include both video and audio content. A tactile stimulus may be presented by instructing the person to touch a certain object, surface, or the like. An olfactory stimulus may be emitted from a scent emitter 118 or the like.

In various embodiments the stimulus module 202 may use peripherals such as a computer monitor 112, speaker 114, and/or scent emitter 118 to present the one or more stimuli, by displaying a visual stimulus on the computer monitor 112, playing an audio stimulus on the speaker 114, or the like. In another embodiment, the stimulus module 202 may present a stimulus by instructing a person to take certain actions. For example, in one embodiment, a stimulus may be a picture in the person's physical possession, and the stimulus module 202 may display instructions on the computer monitor 112, instructing the person to look at the picture. In a further embodiment, a stimulus may be an action performed by the person, such as a hand gesture associated with a brainwave response, and the stimulus module 202 may present the stimulus by instructing the person to make the hand gesture. In view of this disclosure, many types of stimuli and ways of presenting stimuli are clear.

In one embodiment, the one or more stimuli presented by the stimulus module 202 may include multiple stimuli of more than one type. For example, in a certain embodiment, the stimulus module 202 may present a sequence of stimuli of various types. In another embodiment, the stimulus module 202 may present multiple stimuli simultaneously. For example, separate visual and audio stimuli may be presented simultaneously, or two visual stimuli may be presented on different sides of a display.

In a certain embodiment, the one or more presented stimuli may be presented by the stimulus module 202 one at a time in random order. For example, stimuli may be randomly selected, with or without replacement, and presented one at a time. In a certain embodiment, the stimulus module 202 may randomly select the presented stimuli from a larger plurality of stimuli. In another embodiment, the one or more presented stimuli may be presented by the stimulus module 202, for random durations. For example, the stimulus module 202 may select or generate a random number of seconds, between a minimum number of seconds and a maximum number of seconds, and present a stimulus for the randomly selected or generated duration. Randomizing the number, order, or duration of the stimuli may, in some embodiments, produce different brainwave responses at different times, thus preventing an unauthorized person from obtaining access by playing back a previously recorded response.

In one embodiment, the stimulus module 202 may present one stimulus. In another embodiment, the stimulus module 202 may present multiple stimuli. In a certain embodiment, the stimulus module 202 may present additional stimuli if the response to the previously presented stimuli is insufficient to authenticate the person.

In one embodiment, the apparatus 200 includes a response module 204 configured to measure a brainwave response of the person to the one or more stimuli presented by the stimulus module 202. In various embodiments, a response module 204 may include an EEG monitor 110, a camera 116, a hardware circuit, a programmable hardware device, one or more processors, and/or a computer readable storage medium that stores code for execution by one or more processors. Other embodiments may include similar or equivalent devices for measuring a brainwave response.

In certain embodiments, brainwaves may refer to any electrical activity of the brain, or that may be measured at the scalp. Thus, in various embodiments, brainwaves may include neural oscillations or rhythmic activity (e.g., delta waves, theta waves, alpha waves, beta waves, gamma waves, mu waves, or the like), transients, and/or ultra-slow or near-DC activity. In further embodiments, a brainwave response to the presented stimuli may include any change, pattern, or activity in the person's brainwaves that occurs in response to the presented stimuli.

In one embodiment, the response module 204 may be configured to measure a brainwave response of the person to the one or more stimuli using the EEG monitor 110. In a certain embodiment, measuring a brainwave response may include detecting, amplifying, and/or recording an electrical signal using from one or more EEG electrodes. For example, an EEG monitor 110 including one or more EEG electrodes may be placed on the person's head, and the electrical signal from the electrodes may be recorded. In another embodiment, the response module 204 may transform, encode, or hash the signal from the EEG monitor 110, and may record the transformed or encoded signal.

In one embodiment, the response module 204 may receive one or more inputs from a person other than, or in addition to a brainwave response. For example, in a certain embodiment, the response module 204 may measure a brainwave response of the person to the presented stimuli, and may additionally measure a facial response, a movement in response to a stimulus, or the like, using a camera 116. In another embodiment, the response module 204 may receive an input from the person such as a password, a fingerprint scan, or the like. In certain embodiments, authenticating a person based on the measured brainwave response and on one or more inputs from the person other than a brainwave response may provide two-factor or multi-factor authentication.

In one embodiment, the apparatus 200 includes an authentication module 206 configured to authenticate the person based on the measured brainwave response measured by the response module 204. In various embodiments, an authentication module 206 may include a data storage device 120, a database of prerecorded brainwave responses of the person to various stimuli, a hardware circuit, a programmable hardware device, one or more processors, and/or a computer readable storage medium that stores code for execution by one or more processors. Other embodiments may include similar or equivalent devices for authenticating the person.

In general, authenticating a person may involve determining or confirming a person's identity, or determining whether a person is authorized to access a computer system, resources controlled by the computer system, a physical location, a financial account, or the like. Thus, in one embodiment, authenticating a person may include receiving a purported identity for the person (such as a name, username, login, ID number, email address, or the like), and determining whether the person's actual identity matches the purported identity. For example, in one embodiment, the authentication module 206 could prompt a person to enter a username, compare a brainwave response to presented stimuli, from the response module 204, to one or more prerecorded responses associated with the username, and determine whether the person is the authorized user associated with the username based on the brainwave response.

In certain embodiments, determining whether the person's actual identity matches a purported identity such as a username may allow the presented stimuli to be selected from stimuli previously selected by the person associated with that username, and may allow the responses to be compared against prerecorded responses associated with that username. In certain embodiments, an authentication module 206 that determines whether a person's actual identity matches the person's purported identity may provide fast authentication by comparing the person's responses to the responses of one authorized user. However, the person's direct involvement in the authentication process may be increased. For example, authentication may not be a hands-free process if the person is prompted to type a username.

In another embodiment, authenticating a person may involve determining a person's identity, determining that the person is authorized to access a resource, or determining that the person is not authorized to access a resource, without reference to a purported identity. For example, in one embodiment, the authentication module 206 could compare a brainwave response against a database of prerecorded responses for multiple authorized people, to determine if the person is (or is not) one of the authorized people. Comparing the measured brainwave response to the responses of multiple people may increase the computational complexity of the authentication process, or the number of stimuli that are presented (especially if responses to different stimuli are prerecorded for different people), but may provide a hands-free authentication process where a person is not prompted to provide a purported identity.

In various embodiments, the authentication module 206 may authenticate the person based on the measured brainwave response, by comparing the measured brainwave response to a prerecorded response or responses to the presented stimuli, performing a statistical analysis to determine how well the response matches the recorded responses, and/or coordinating with a confidence module 304 (as described below with regard to FIG. 3) to determine a likelihood that the person is correctly identified, a confidence factor, or another metric upon which one or more criteria for authenticating a person may be based. In various embodiments, the authentication module 206 may use various criteria to authenticate a person. For example, an authentication module 206 for a higher-security system may be configured to confirm an identity based on a closer match between the measured brainwave response and a prerecorded response than an authentication module 206 for a lower-security system uses to confirm an identity. Criteria for authenticating a person may be predetermined, entered by an administrator for the apparatus 200, changed by an administrator for the apparatus 200, customized such that different criteria are used by the authentication module 206 in relation to requests to access different resources, or the like.

In certain embodiments, authenticating a person may include granting or denying access to a computer system, one or more associated resources, a physical location, a financial account, or the like, based on determining or confirming the person's identity, or on determining whether the person is an authorized user of the resources the person is attempting to access. For example, in one embodiment, the authentication module 206 may confirm that a person is an authorized user of certain resources, and may provide access to those resources. In another embodiment, the authentication module 206 may determine that a person is not an authorized user of certain resources, and may deny access to the resources.

In one embodiment the authentication module 206 is configured to authenticate the person based on the measured brainwave response and on one or more inputs from the person other than a brainwave response. In certain embodiments, inputs other than a brainwave response may be received by the response module 204 as described above, and may include responses, other than brainwave responses, to the presented stimuli (such as facial responses, movement responses, or the like), and/or other information provided in any way by the person, such as a password, passphrase, personal identification number, response to a security question, identity card, security token, signature, fingerprint, retinal pattern and/or additional factors. In certain embodiments, inputs other than a brainwave response may be based on knowledge (e.g., something the person knows, such as a password), ownership or possession (e.g., something the person has, such as a security token), and/or inherence (e.g., something the person is or does, such as a fingerprint, voiceprint, or other biometric). In various embodiments, the authentication module 206 may compare both the measured brainwave pattern and the additional input(s) from a person to known, expected, or prerecorded information, to authenticate the person. In view of this disclosure, many types of inputs, that the authentication module 206 may use to authenticate a person, are clear.

Figure 3:
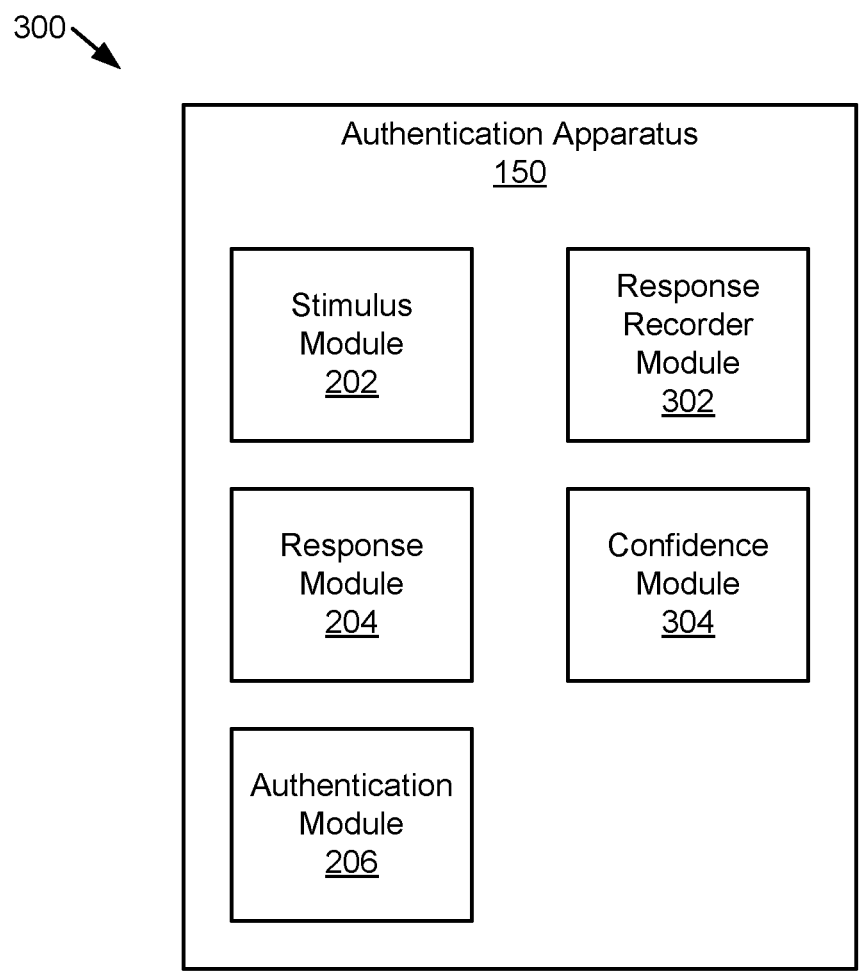
FIG. 3 is a schematic block diagram illustrating another embodiment of an apparatus for stimuli-based authentication.

FIG. 3 depicts another embodiment of an apparatus 300 for stimuli-based authentication. The apparatus 300 includes another embodiment of the authentication apparatus 150 with a stimulus module 202, a response module 204, and an authentication module 206, which are substantially similar to those described above in relation to the apparatus 200 of FIG. 2. In various embodiments, the apparatus 300 may also include a response recorder module 302 and a confidence module 304, which are described below.

In one embodiment, the apparatus 300 includes a response recorder module 302 configured to record a plurality of brainwave responses of the person to a plurality of stimuli. In a certain embodiment, the one or more presented stimuli, presented by the stimulus module 202, are selected from the plurality of stimuli for which responses are recorded by the response recorder module 302. In some embodiments, the apparatus 300 may further include a data storage device 120 for storing the recorded brainwave response.

In various embodiments, a response recorder module 302 may include an EEG monitor 110, a camera 116, a computer monitor 112, a speaker 114, a scent emitter 118, a data storage device 120, a hardware circuit, a programmable hardware device, one or more processors, and/or a computer readable storage medium that stores code for execution by one or more processors. Other embodiments may include similar or equivalent devices for recording brainwave responses to a plurality of responses.

In general, in various embodiments, the authentication module 206 may compare a measured brainwave response from the response module 204 to one or more responses recorded by the response recorder module 302, to authenticate a person. In one embodiment, the response recorder module 302 may present a plurality of stimuli to a person, or may cooperate with the stimulus module 202 to present the plurality of stimuli for recording, as described above with regard to the stimuli that are presented to authenticate the person. In a further embodiment the response recorder module 302 may measure or record responses to the plurality of stimuli, or may cooperate with the response module 204 to measure or record the responses, as described above with regard to measuring a brainwave response for authenticating the person.

In various embodiments, the response recorder module 302 may record brainwave responses by directly recording data received for the responses, or by transforming the received data in some way (e.g., by digitizing, filtering, encoding, hashing, simplifying, applying a mapping or other function, or the like), and by recording the transformed data. In certain embodiments, the response recorder module 302 may record the data using data storage device 120.

In one embodiment, a plurality of stimuli may be presented for recording responses, and a corresponding plurality of responses to the stimuli may be recorded by the response recorder module 302. In certain embodiments, a person's response to a single stimulus may be sufficient to authenticate the person. However, a person's response to a stimulus may vary over time with the person's emotional state, physical condition, surroundings, or the like. Thus, in certain embodiments, a response to a single stimulus, or a small number of stimuli, may not be sufficient for authenticating the person. Accordingly, a response recorder module 302 that records a plurality of responses to a plurality of stimuli may provide a database of multiple possible responses to different stimuli. The stimulus module 202 may then select one or more stimuli from the plurality of stimuli with recorded responses, to present for authentication.

In certain embodiments, because the authentication module 206 authenticates people based on a comparison of the measured brainwave response to a response or responses prerecorded by the response recorder module 302, access to the response recorder module 302 may be carefully controlled to prevent unauthorized people from masquerading as authorized people by adding their own responses to the prerecorded responses. For example, in one embodiment, the response recorder module 302 may limit access by authenticating people using a factor(s) other than a brainwave response, and denying access to unauthorized people. In another embodiment, the response recorder module 302 may limit access by requiring approval from a higher-level user or administrator before recording brainwave responses for a person. In another embodiment, the response recorder module 302 may record brainwave responses from a single authorized computer, such as the server 102, or a limited set of authorized computers, where physical access to the authorized computers is controlled or limited. In still another embodiment, however, the response recorder module 302 may be accessed by any person creating a user account, to associate recorded brainwave responses with the newly created account. In a further embodiment, the person may later record additional brainwave responses for the same account after being authenticated based on the previously recorded responses. In view of this disclosure, many ways of preventing unauthorized people from adding their own responses to the responses of authorized people are clear.

In one embodiment, one or more of the plurality of stimuli is selected by the person for recording a response using the response recorder module 302, based on an emotional relevance of the one or more selected stimuli to the person. In various embodiments, an emotionally relevant stimulus may refer to any stimulus that causes an emotional response, or that the person associates with a particular emotion. In certain embodiments, any stimulus may cause a brainwave response. However, in further embodiments, an emotionally relevant stimulus may cause a stronger brainwave response, a brainwave response that differs significantly from responses of other people for whom the stimulus has little or no emotional relevance, or the like. Thus, selecting a stimulus for recording a response based on the emotional relevance of that stimulus to the person may facilitate authentication by differentiating the authorized person's response from the possible responses of other people. For example, in one embodiment, the person may select a picture of the person's children to use as a stimulus for recording a response. The brainwave response based on the person's emotional response to that picture may significantly differ from the responses other people might have to the same picture.

In certain embodiments, recording a plurality of brainwave responses of the person to a plurality of stimuli, using the response recorder module 302, may include recording multiple brainwave responses for a stimulus. In certain embodiments, a person's response to a stimulus may vary over time with the person's emotional state, physical condition, surroundings, or the like. For example, if a picture of the person's family is used as a stimulus, the person's brainwave response may vary if the person is upset with a family member. However, some factors, elements, or details of a person's brainwave response may be consistent over time, or across multiple presentations of the same stimulus.

Thus, in some embodiments, the response recorder module 302 may record multiple brainwave responses for a stimulus. In one embodiment, the response recorder module 302 may record the multiple brainwave responses for statistical analysis and comparison by the authentication module 206. In another embodiment, the response recorder module 302 may record a multivariate statistical analysis of the multiple responses, and the authentication module 206 may compare features of a response measured by the response module 204 to common features identified by the statistical analysis. In view of this disclosure, many ways are clear of recording multiple brainwave responses for a stimulus and using the multiple recorded responses as a basis of comparison for the authentication module 206.

In one embodiment, the apparatus 300 includes a confidence module 304 configured to compare the measured brainwave response, measured by the response module 204, to one or more prerecorded responses, to determine a likelihood that the person is correctly identified. In a further embodiment, the prerecorded responses include prerecorded responses of the person to the one or more presented stimuli, presented by the stimulus module 202. In a certain embodiment, authenticating the person may include communicating with the confidence module 304 to determine the likelihood that the person is correctly identified.

In various embodiments, a confidence module 304 may include a data storage device 120, a hardware circuit, a programmable hardware device, one or more processors, and/or a computer readable storage medium that stores code for execution by one or more processors. Other embodiments may include similar or equivalent devices for determining the likelihood that the person is correctly identified.

In one embodiment, the authentication module 206 may use, cooperate with, or communicate with the confidence module 304. In a certain embodiment, the confidence module 304 compares the measured brainwave response to prerecorded responses, and determines a likelihood that the person is correctly identified. In a further embodiment, the authentication module 206 authenticates the person based on the determined likelihood.

In various embodiments, a person may be correctly identified if the person's actual identity matches a login, username, or other purported identity provided by the person, if the person's actual identity is correctly determined independent of a purported identity, if the person is correctly determined to be an authorized user of a computer system or other resource, and/or if the user is correctly determined to be an unauthorized user of the computer system or other resource.

In certain embodiments, people's brainwave responses may vary over time, and measured brainwave responses may not be an exact match to the prerecorded responses, or even to any of multiple prerecorded responses to the same stimulus. Thus, in certain embodiments, the confidence module 304 may determine a likelihood that the person is correctly identified, or a likelihood that the measured brainwave response is a positive match to (or a negative match against) the prerecorded responses. In one embodiment the likelihood may be based on a statistical analysis of the measured brainwave response and the prerecorded responses, a comparison of the measured brainwave response to the prerecorded responses, or the like.

In one embodiment, a high likelihood that the measured brainwave response matches the prerecorded responses may be used by the authentication module 206 to determine that the person is authorized to access a resource, and a low likelihood that the measured brainwave response matches the prerecorded responses (or a high likelihood that the responses do not match) may be used by the authentication module 206 to determine that the person is not authorized to access a resource. An intermediate likelihood may indicate that more information should be obtained to make a determination.

Thus, in one embodiment, the apparatus 300 may present one or more additional stimuli to the person, measure an additional brainwave response of the person to the one or more additional stimuli, and compare the measured additional brainwave response to one or more prerecorded responses to determine an updated likelihood that the person is correctly identified, in response to the likelihood failing to satisfy a confidence threshold. In a further embodiment, the prerecorded responses include prerecorded responses of the person to the one or more additional stimuli.

In certain embodiments, one or more confidence thresholds may be established by a user or administrator of the apparatus 300, and the confidence module 304 may determine whether the likelihood that the person is correctly identified satisfies the one or more thresholds. For example, in one embodiment, one confidence threshold may be established that is satisfied if the likelihood of a match between the measured brainwave response and the prerecorded responses is above the threshold. Satisfying the threshold may indicate that the person is authorized to access a resource, and failure to satisfy the threshold may indicate insufficient confidence that the person is authorized to access the resource. In a further embodiment, a second confidence threshold may be established that is satisfied if the likelihood of a match is below the threshold. Satisfying the threshold may indicate that the person is not authorized to access a resource, and failure to satisfy the threshold may indicate insufficient confidence that the person is not authorized to access the resource.

In a certain embodiment, two confidence thresholds may be used, dividing the range of possible likelihoods into subranges indicating confidence that the person is authorized, confidence that the person is unauthorized, and insufficient confidence as to whether the person is authorized or unauthorized. In various embodiments, different confidence thresholds or ranges may be established based on different security levels. For example a higher-security system may establish a higher threshold for confidence that the person is correctly identified.

In one embodiment, the confidence module 304 may determine that the likelihood that the person is correctly identified fails to satisfy a confidence threshold. In a further embodiment, failing to satisfy the confidence threshold may indicate a low likelihood that the person is correctly identified. Thus, in various embodiments, in response to the likelihood failing to satisfy the confidence threshold, the stimulus module 202 may present one or more additional stimuli to the person. The response module 204 may measure an additional brainwave response of the person to the one or more additional stimuli, and the confidence module 304 may compare the measured additional brainwave response to one or more prerecorded responses to determine an updated likelihood that the person is correctly identified, where the prerecorded responses include prerecorded responses of the person to the one or more additional stimuli. In various embodiments, measuring responses to additional stimuli may provide additional data so that the authentication module 206 can authenticate the person with a sufficient degree of confidence.

Figure 4:
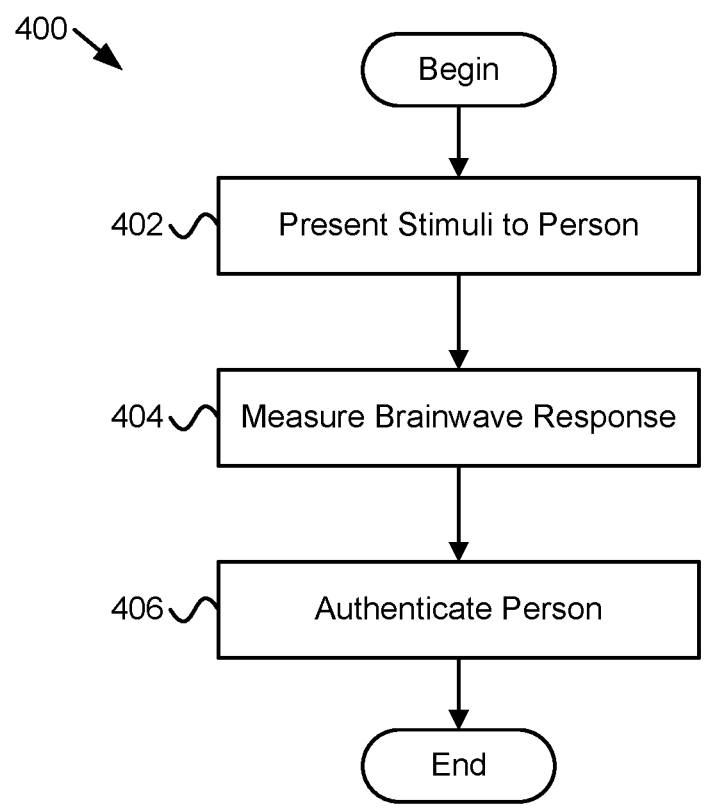
FIG. 4 is a schematic flow chart diagram illustrating one embodiment of a method for stimuli-based authentication.

FIG. 4 depicts one embodiment of a method 400 for stimuli-based authentication. The method 400 begins and presents 402 one or more stimuli to a person. In one embodiment, the stimulus module 202 presents 402 the one or more stimuli. The method 400 measures 404 a brainwave response of the person to the one or more stimuli. In one embodiment, the response module 204 measures 404 the response. The method 400 authenticates 406 the person based on the measured brainwave response, and the method 400 ends. In one embodiment the authentication module 206 authenticates 406 the person.

Figure 5:
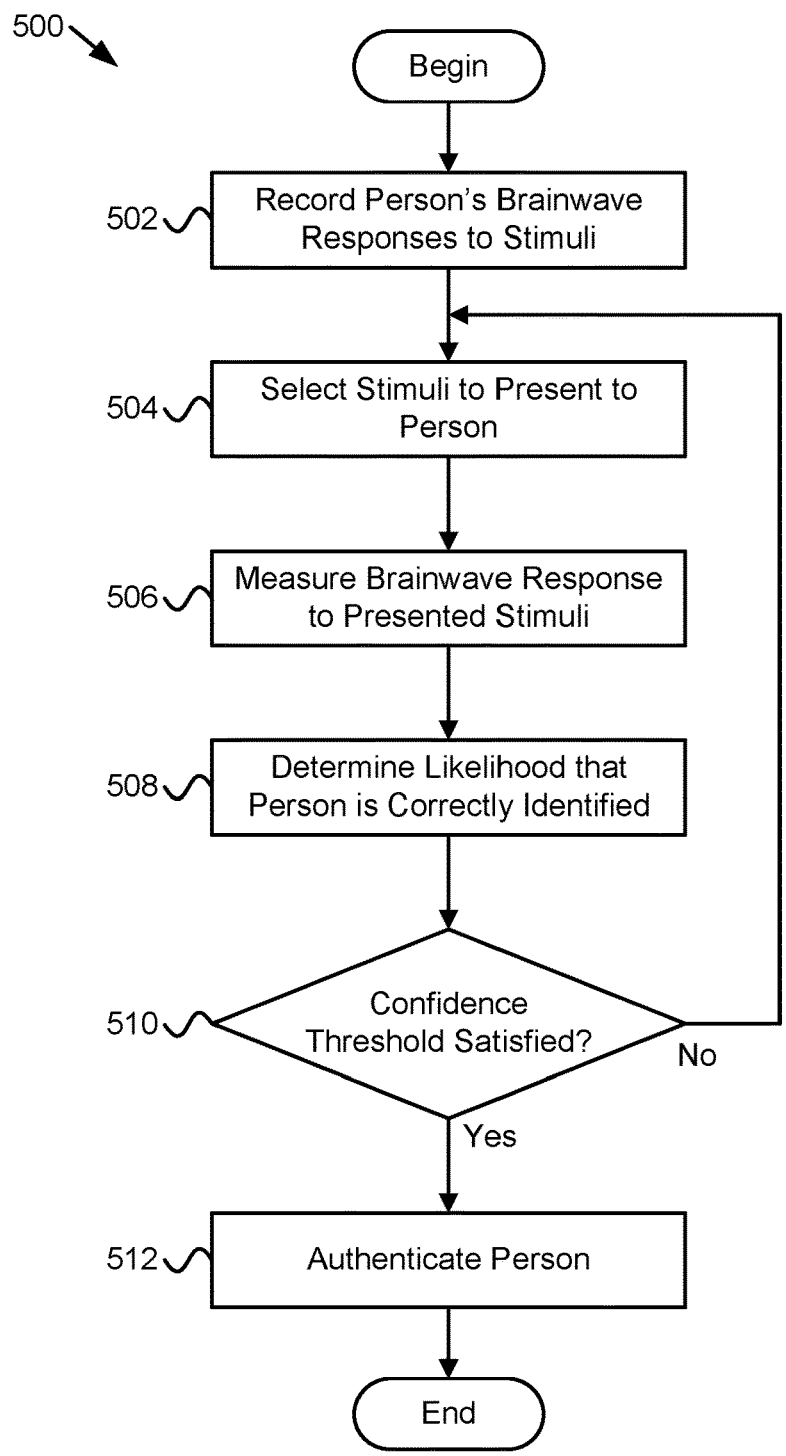
FIG. 5 is a schematic flow chart diagram illustrating another embodiment of a method for stimuli-based authentication.

FIG. 5 depicts another embodiment of a method 500 for stimuli-based authentication. The method 500 begins and records 502 a plurality of brainwave responses of a person to a plurality of stimuli. In one embodiment, the response recorder module 302 records 502 the responses. The method 500 selects 504 one or more stimuli to present to the person. In one embodiment, the stimulus module 202 selects 504 the one or more stimuli to present. The method 500 measures 506 a brainwave response of the person to the one or more presented stimuli. In one embodiment, the response module 204 measures 506 the brainwave response. The method 500 determines 508 a likelihood that the person is correctly identified. In one embodiment, the confidence module 304 determines 508 the likelihood that the person is correctly identified.

The method 500 determines 510 whether a confidence threshold is satisfied. In various embodiments, the confidence module 304 and/or the authentication module 206 may determine 510 whether the confidence threshold is satisfied. If the confidence threshold is satisfied, the method 500 authenticates 512 the person, and the method 500 ends. In one embodiment, the authentication module 206 may authenticate 512 the person. If the confidence threshold is not satisfied, the method 500 selects 504 additional stimuli to present to the person, and the method 500 continues.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
presenting, using a stimulus module, one or more stimuli to a person, wherein the stimulus module prevents imitation of a correct response by the person, by presenting the one or more presented stimuli to the person for random durations;
measuring, using a response module and an electroencephalography ("EEG") monitor, a brainwave response of the person to the one or more stimuli; and
authenticating, using an authentication module, the person based on the measured brainwave response,
wherein said modules comprise one or more of hardware circuits, a programmable hardware device, and a processor.

2. The method of claim 1, further comprising recording, using a response recorder module, a plurality of brainwave responses of the person to a plurality of stimuli, wherein the one or more presented stimuli are selected from the plurality of stimuli.

3. The method of claim 2, wherein one or more of the plurality of stimuli is selected by the person for recording a response based on an emotional relevance of the one or more selected stimuli to the person.

4. The method of claim 2, wherein recording a plurality of brainwave responses of the person to a plurality of stimuli comprises recording multiple brainwave responses for a stimulus.

5. The method of claim 1, wherein the one or more presented stimuli comprise one or more of a visual stimulus, an audio stimulus, an audiovisual stimulus, a tactile stimulus, and an olfactory stimulus.

6. The method of claim 5, wherein the one or more presented stimuli comprise multiple stimuli of more than one type.

7. The method of claim 1, wherein the one or more presented stimuli are presented to the person one at a time in a random order.

8. The method of claim 1, wherein authenticating the person comprises comparing the measured brainwave response to one or more prerecorded responses to determine a likelihood that the person is correctly identified, the prerecorded responses comprising prerecorded responses of the person to the one or more presented stimuli.

9. The method of claim 8, further comprising, in response to the likelihood that the person is correctly identified failing to satisfy a confidence threshold:
presenting, using the stimulus module, one or more additional stimuli to the person;
measuring, using the response module, an additional brainwave response of the person to the one or more additional stimuli; and
comparing, using a confidence module, the measured additional brainwave response to one or more prerecorded responses to determine an updated likelihood that the person is correctly identified, wherein the prerecorded responses comprise prerecorded responses of the person to the one or more additional stimuli.

10. The method of claim 1, wherein the person is authenticated based on the measured brainwave response and on one or more inputs from the person other than a brainwave response.

11. A program product comprising a non-transitory computer readable storage medium that stores code executable by a processor, the executable code comprising code to perform:

presenting one or more stimuli to a person, wherein imitation of a correct response by the person is prevented by presenting the one or more presented stimuli to the person for random durations;

measuring, using an electroencephalography ("EEG") monitor, a brainwave response of the person to the one or more stimuli; and authenticating the person based on the measured brainwave response.

12. The program product of claim 11, the executable code further comprising code to perform:

recording a plurality of brainwave responses of the person to a plurality of stimuli, wherein the one or more presented stimuli are selected from the plurality of stimuli.

13. The program product of claim 12, wherein one or more of the plurality of stimuli is selected by the person for recording a response based on an emotional relevance of the one or more selected stimuli to the person.

14. The program product of claim 12, wherein recording a plurality of brainwave responses of the person to a plurality of stimuli comprises recording multiple brainwave responses for a stimulus.

15. A system comprising:

an electroencephalography ("EEG") monitor;

a stimulus module configured to present one or more stimuli to a person, wherein the stimulus module prevents imitation of a correct response by the person, by presenting the one or more presented stimuli to the person for random durations;

a response module configured to measure a brainwave response of the person to the one or more stimuli using the EEG monitor; and an authentication module configured to authenticate the person based on the measured brainwave response, wherein said modules comprise one or more of hardware circuits, a programmable hardware device, and a processor.

16. The system of claim 15, further comprising:

a response recorder module configured to record a plurality of brainwave responses of the person to a plurality of stimuli, wherein the one or more presented stimuli are selected from the plurality of stimuli; and a data storage device for storing the recorded brainwave responses.

17. The system of claim 16, wherein one or more of the plurality of stimuli is selected by the person for recording a response based on an emotional relevance of the one or more selected stimuli to the person.

18. The system of claim 16, wherein recording a plurality of brainwave responses of the person to a plurality of stimuli comprises recording multiple brainwave responses for a stimulus.

19. The system of claim 15, further comprising a confidence module configured to compare the measured brainwave response to one or more prerecorded responses to determine a likelihood that the person is correctly identified, the prerecorded responses comprising prerecorded responses of the person to the one or more presented stimuli.

* * * * *